July 16, 1963   J. M. MORRIS   3,097,958
FLUIDIZED COATING MACHINE
Filed June 10, 1958   3 Sheets-Sheet 1
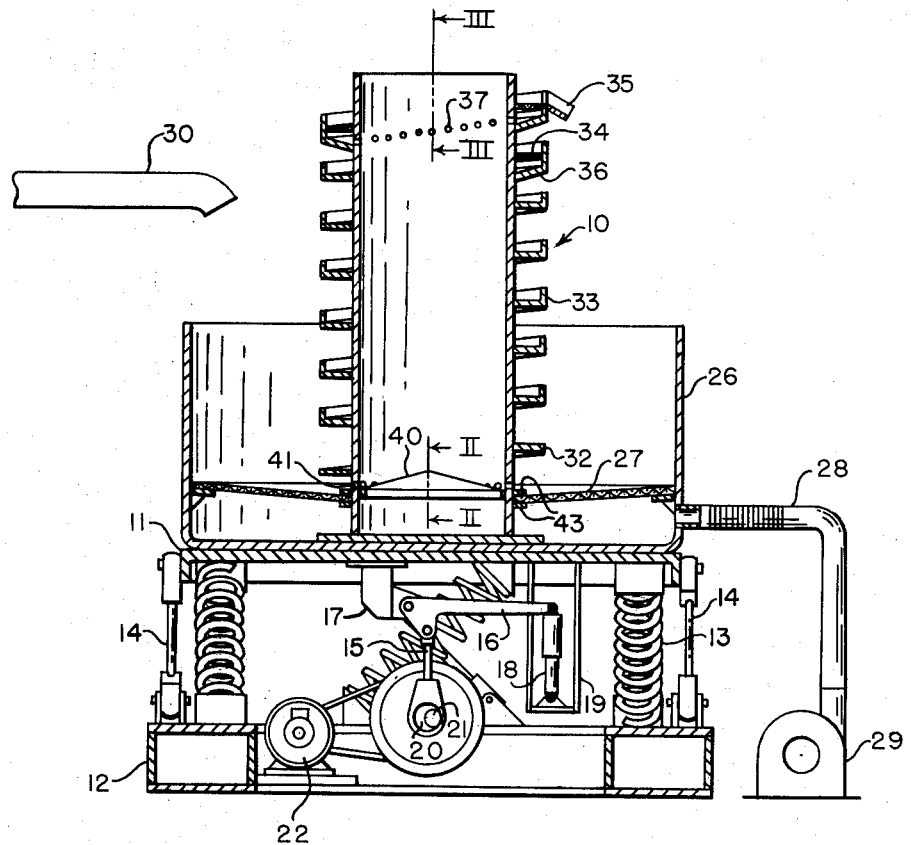
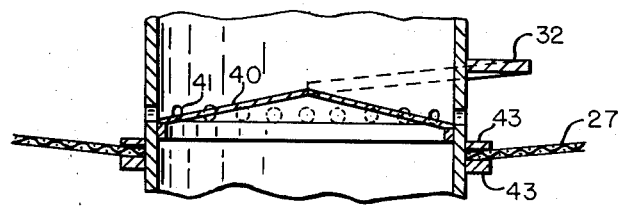
INVENTOR.
JOHN M. MORRIS
BY
Marshall, Marshall and Yeasling
ATTORNEYS

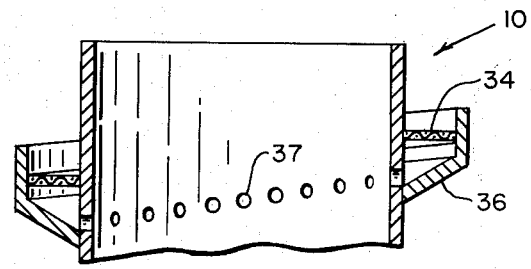
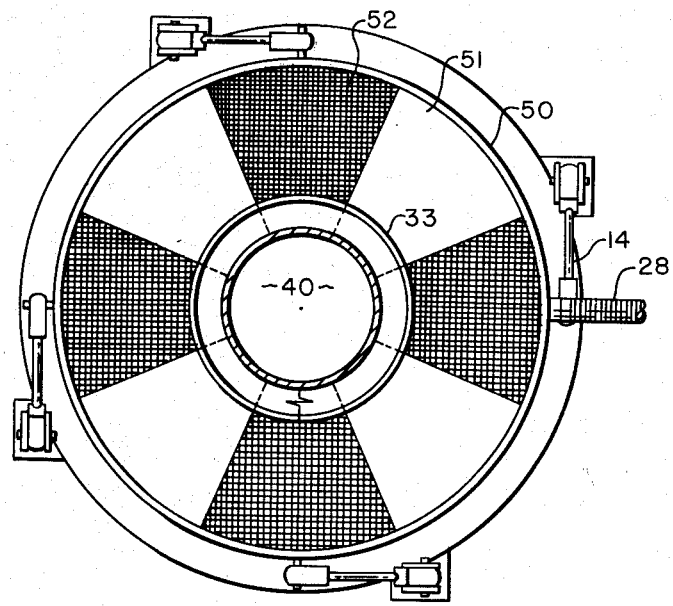

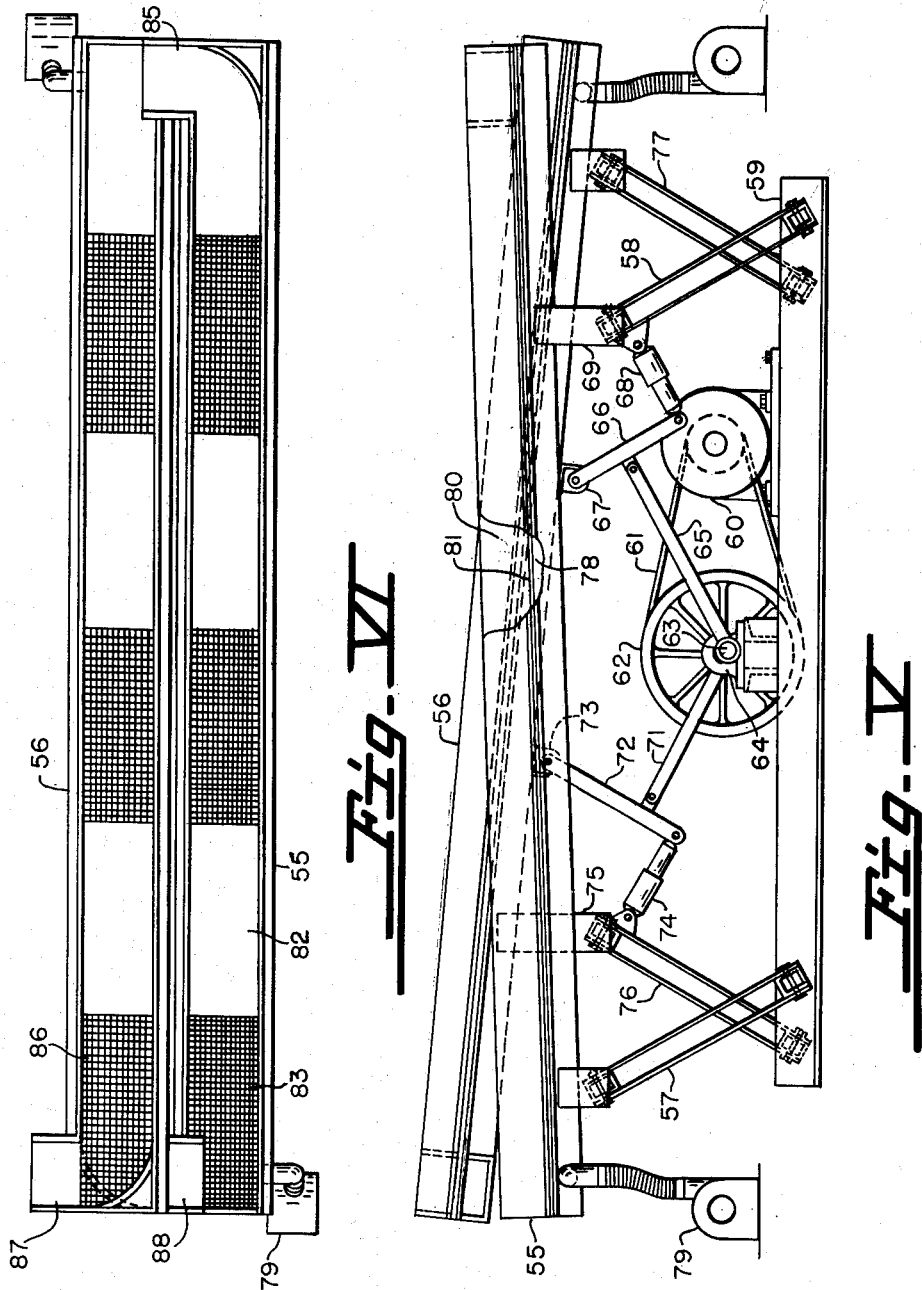

United States Patent Office 3,097,958
Patented July 16, 1963

3,097,958
FLUIDIZED COATING MACHINE
John M. Morris, Louisville, Ky., assignor, by mesne assignments, to Chain Belt Company, Milwaukee, Wis., a corporation of Wisconsin
Filed June 10, 1958, Ser. No. 741,179
9 Claims. (Cl. 117—20)

This invention relates to material treating apparatus and in particular to vibratory equipment for coating a material in particle or pellet form with a fine powder to prevent the particles or pellets from sticking together.

Intermediate products in many manufacturing processes are stored in pellet form. Oftentimes these pellets of material are of a sticky or tacky nature which if allowed to contact each other directly results in a fusion or adhesion and instead of remaining in pellet form the material agglomerates into large masses unsuited for further processing. To prevent this agglomeration of pellets it is common practice to coat the pellets with a fine powdery material that is acceptable as far as further processing is concerned but which serves to prevent the pellets from adhering to each other.

The principal object of this invention is to provide a vibratory apparatus with means for maintaining a bed of powdery material through which the pellets or particles of other material may be conveyed and coated with powder while being so conveyed.

Another object of the invention is to provide a vibratory conveyor with a portion that maintains a bed of powdery material in fluidized form and through which pellets or particles of other material are conveyed and subsequently separated from the bed of powder after being coated with powder.

Another object of the invention is to provide a vibratory conveyor through which a powdery material and a pellet material may be simultaneously passed with the powdery material being alternately fluidized and allowed to settle in successive sections of the conveyor.

A still further object of the invention is to provide a vibratory material treating apparatus in which pelletized material and powdery material are intimately mixed and in which the excess powdery material is separated from the pellet material and returned to the bed of powdery material for reuse while the coated pellets or particle material are delivered to an output delivery point.

These and more specific objects and advantages are obtained in vibratory material treating apparatus constructed according to the invention.

According to the invention a vibratory conveyor, either a helical ramp conveyor or a straight line conveyor, is provided with a bed of powdery material at least a portion of which is fluidized and through which the pellets or particles of other material are conveyed by the vibratory action of the conveyor. The particles or pellets are conveyed out of the bed of powdery material and the excess of powdery material carried with the particles or pellets is separated and returned automatically to the bed of material.

Preferred forms of the invention are illustrated in the accompanying drawings.

In the drawings:

FIGURE I is a vertical section of a helical conveyor including means for driving the conveyor and means for maintaining a bed of fluidized powdery material at the base of a helical ascending ramp of the conveyor.

FIGURE II is an enlarged vertical section of the conveyor taken substantially along the line II—II of FIGURE I.

FIGURE III is an enlarged fragmentary section taken substantially along the line III—III of FIGURE I.

FIGURE IV is a plan view of a modified form of receptacle for the bed of powdery material at the base of the helical ramp of the conveyor.

FIGURE V is a side elevation of a straight line conveyor arranged to operate according to the invention.

FIGURE VI is a plan view of the straight vibratory conveyor shown in FIGURE V.

These specific figures and the accompanying description are intended to merely illustrate the invention and not to impose limitations on its scope.

In a material treating apparatus according to the invention a helical conveyor is mounted on a vibratory base 11 which in turn is resiliently mounted from a fixed base 12 that rests on the floor of the building or other structure where the apparatus is employed. The vibratory base 11 is supported on a combination of inclined helical springs 13 and inclined links 14. For most applications of the helical vibratory motion the structs 14 are inclined approximately 30 degrees from the vertical and the axes of the coil springs 13 are arranged to be perpendicular to the struts. While only a few of the structs and springs are shown in the figure to illustrate their position an ordinary vibratory base may employ as many as twelve to sixteen such struts and springs.

Helical vibratory motion of the vibratory base 11 is produced by vertically directed vibratory force applied through a connecting rod 15 to a lever 16 one end of which is fulcrumed in a fulcrum stand 17 depending from the vibratory base 11. The other end of the lever is connected through a shock absorber 18 and depending frame work 19 to the vibratory base 11. Thus all of the force transmitted through the connecting rod 15 is applied to the vibratory base 11 while the gradual extension or contraction of the shock absorber 18 allows the vibratory base 11 to settle under load without transmitting corresponding static load forces to the connecting rod 15. The lower end of the connecting rod 15 is carried on an eccentric 20 of a crank shaft 21 that is belt driven from a drive motor 22.

A relatively deep open-top container 26, rigidly mounted on the vibratory base 11, surrounds the lower end of the helical conveyor 10. The container 26, in the nature of a tub or deep bowl, preferably has a flat bottom to match the upper surface of the vibratory base 11 to facilitate the mounting of the container 26 and helical conveyor 10 on the base 11. A porous deck or secreen 27 is mounted in the container 26 a short distance from its bottom and is arranged to slope gradually from the sides of the container 26 inwardly and downwardly toward the bottom end of the helical conveyor 10.

According to the invention a bed of fine powdery material with which pellets or particles of other material are to be coated is held in the container 26 above the porous deck 27 and is maintained in a fluidized condition by air or other fluidizing medium supplied through a flexible pipe 28 from a blower 29. The porous deck 27 may be made of a woven material or any similar material that permits the passage of air without permitting the powdery material to sift downwardly through it. Pellets or particles of material are fed from a chute 30 into the container 26 near its side so that the pellets may sink through the bed of fluidized material in the vibrating container and then be conveyed in spiral paths downwardly and inwardly over the porous deck 27 toward the lower end of the helical conveyor 10. As the particles of material or pellets reach the helical conveyor 10 they are picked up by lower narrow flights 32 of the conveyor and, because of the vibratory conveying action, travel around such flights and upwardly out of the bed of fluidized material. Preferably the first few turns of the flights 32 are relatively narrow or are equipped with diverters so that the pellets are carried out of the bed at a limited rate thus providing a control of the time that the pellets are retained in the bed of fluidized powdery material while being coated with the powdery material.

Intermediate and upper flights of the conveyor are provided with sidewalls 33 to prevent the material from falling back into the container 26. Alternatively, the flights may be inclined or banked toward the center support tube to cause the material to follow the flights. At the upper end of the helical conveyor the last turn or two of the flights are provided with a screen deck 34 providing a continuation of the solid deck of the lower flights and this screen deck discharges to a discharge chute 35. Any powdery material falling through the screen deck 34 is caught on a lower channel 36 that slopes inwardly toward the center of the helical conveyor so that the powdery material falling through the screen is discharged through ports 37 into the interior of the center tube of the conveyor.

The fine material dropping through the ports 37 falls onto a spreader cone 40 near the bottom of the center tube of the conveyor 10 and is directed outwardly through ports 41 into the active bed of fluidized material. Thus, the fine powder carried with but not adhering to the particles or pellets carried up the conveyor 10 is returned to the bed of fluidized material for reuse. With some powdery materials it may be necessary to form the cone 40 of a porous material and pass air from the blower 29 through this cone as well as through the porous deck 27 to keep the material in the center tube fluidized so that it will flow outwardly through the ports 41.

FIGURE II illustrates the cone at the bottom of the helical conveyor and the adjacent flights 32 in greater detail. As illustrated, the porous deck 27 is clamped to the helical conveyor tube by means of rings 43 to form a tight seal at this point.

FIGURE III illustrates the upper end of the helical conveyor 10 in greater detail to show the screen surface 34 that carries the coated pellets for the final turn or two of the conveyor and the powder collecting channel 36 located just below and in communication with the under side of the screen deck 34. The bottom of the channel 36 is sloped inwardly toward the tube of the helical conveyor 10 so that the powdery material feeds to the ports 37 and into the tube.

In the operation of the equipment shown in FIGURES I, II, and III pellets or large particles of materials to be coated are dropped into the outer portion of the container 26 and then because of the vibratory motion of the conveyor follow along the porous deck 27 in gradually decreasing spiral paths. During this travel the pellets are constantly immersed in the fluidized powdery material the fluidization of which permits it to flow very readily between the larger pellets or particles of material and thus secure a very intimate mixing of the powder and pellets. The vibration of the particles as they are conveyed in this spiral path continually reorients each particle with respect to its neighbors so that all portions of its surface are exposed to the powder. The pellets as they feed toward the conveyor 10 tend to collect around the base of the conveyor because of the limited rate at which they are removed by the lower flights 32. By selection of the widths of the lower flights of the conveyor and arranging such widths to increase progressively as the conveyor climbs out of the fluidized bed it is possible to regulate the depth of pellet material by regulating the input flow through the chute 30. If the flow through the chute decreases the level of particles or pellets in the container 26 will decrease to a point where the conveyor removes pellets at the same rate as they are being admitted. As more are being admitted per unit of time and more pellets collect about the base of the conveyor they will reach up to higher and wider flights of the deck and thus will be conveyed out of the bed of material at a faster rate. This makes it possible to vary the retention time independently of the speed of operation of the vibratory mechanism.

It occasionally happens, particularly when the powdery material and the pellets are of generally equal density, that improved mixing action of the materials in the container at the base of the helical conveyor may be obtained by fluidizing portions of the bed of material and allowing other portions to settle under the vibratory influence without the fluidizing effect of the air. In this situation in the region where the fine powdery material is fluidized the pellets or particles sink rapidly to the bottom of the bed. In other regions where there is no fluidization present the material tends to stratify in the reverse order with the pellets or particles near the top of the bed of powdery material. By alternating these regions along the spiral paths that the particles follow from the sides of the container toward the middle of the container and the helical conveyor advantage may be taken of both types of operation. Thus as shown in FIGURE IV the container 50 is like the container 26 except that the porous deck 27 of the container 26 has been replaced by an intermediate deck comprising imperforate sections 51 alternating with pervious sections 52, four of each being shown in the figure. As the pellets or particles of material are fed into the container 50 and mixed with the powdery material therein the mass is conveyed by the vibratory action in a generally circular path with the pellets migrating toward the center. As they cross the impervious sections 51 the powdery material tends to stratify to the bottom of the mixture while the pellets come to the top. Then, as the mass of material moves across the next pervious section, the air rising through the material fluidizes the fine powdery material thereby decreasing its density and reversing the order of stratification so that the pellets sink to the bottom. This alternate rising and sinking of the pellets of material in combination with the vibration provides a very thorough mixing of the powder and pellets.

In the modification shown in FIGURE IV, as well as the first embodiment, the material travels through the fluidized bed of material in a decreasing spiral path. The same general mixing and coating effect may be obtained by causing the pellet material and powder to flow along a straight line path on an ordinary vibratory conveyor equipped with a fluidizing deck. To take advantage of the stratification it is desirable that the deck be made in sections similar to that shown in FIGURE IV so that the pellets of material are alternately carried to the top and then to the bottom of the bed of fluidized material. An arrangement for carrying out this process with straight line conveyors is illustrated in FIGURES V and VI. As shown in these figures a pair of straight conveyor beds 55 and 56 are arranged in parallel relation with the conveyor 55 carried on cantilever leaf spring assemblies 57 and 58 erected from a base 59 serving as a support for both of the conveyors. Vibratory motion is provided by a drive motor 60 that is connected through a belt 61 and drive pulley 62 to a crank shaft 63 that is journaled in bearings 64 erected from the base 59. The crank shaft 63 is connected through a connecting rod 65 and lever 66 to a bracket 67 attached to the lower surface of the conveyor 55. The lower end of the lever 66 is connected through a shock absorber 68 to a bracket 69 that also serves as a support for the upper end of the spring assembly 58.

A second connecting rod 71 connected to a second crank of the crank shaft 63 is connected to a lever 72 the upper end of which is pivoted in a bracket 73 attached to the conveyor 56 and the lower end of which is connected through a shock absorber 74 to a bracket 75 attached to the conveyor 56. The second conveyor 56 is supported on spring assemblies 76 and 77. Each of the conveyors comprises a lower channel 78 that is supplied with air from a blower 79 and a trough or open part 80 serving as a conduit for the material being mixed. A separating deck 81 forming the bottom of the conveyor channel 80 and the top of the lower or air channel 78 is provided with alternating pervious and impervious sections 82 and 83 across which the material is caused to flow by the vibrating action of the conveyor.

The material after being conveyed along the length of the first conveyor 55, from left to right, as seen in FIGURE VI, is discharged through a side discharge chute 85 onto the second conveyor 56. This conveyor is constructed similarly to the conveyor 55 having alternate pervious and impervious deck sections and in addition near its discharge end has a screen section 86 for separating the excess fine material from the particles or pellets of coarse material that have been coated with the fine powdery material. The coated pellets are discharged laterally through a chute 87 while the powdery material dropping through the screen section 86 is discharged through a second chute 88 onto the head end of the conveyor 55 where it is mixed with the incoming particles or pellets of material. Sufficient powdery material is also added at the inlet or head end of the conveyor 55 to make up for the loss of powder carried off on the pellets or particles discharged through the chute 87.

In this arrangement of a pair of parallelly arranged vibratory conveyors the mixture of particles or pellets and powdery material introduced at the head end of the conveyor 55 is alternately conveyed over the impervious or solid portions 82 and the pervious portions 83. While crossing an impervious section the powdery material, if of sufficient density, sinks to the bottom or to the deck while the pellets rise to the top of the mixture. Then as the composite mixture crosses a pervious deck 83 the air supplied from the blower 79, coming up through the pervious section, fluidizes the material so that the fine powdery material is now of lesser density and tends to rise in the air stream so as to reverse the order of stratification of the materials. This action repeats itself for each pair of impervious and pervious sections of the separating deck as the composite material travels along the length of each of the conveyors. This action in combination with the vibration provides very thorough mixing of the materials so that all surfaces of the pellets or particles are exposed to the powdery material to pick up their share of the material.

Experiments with the apparatus and method described hereinbefore has revealed that mechanical vibration of the container utilized to confine the fluidized bed of powdery material has quite appreciably improved the quality of the fluidized bed as well as improving the mixing or coaction between the fluidized powdery material and the coarse particles being coated, while the vibratory action conveys the coarse particles through the fluidized bed. For example, the mechanical agitation, advantageously the type of vibratory conveying action shown herein, improves the dispersion of the fluidizing gas in a mass of fluidizable material resulting in a true fluid bed with a much shallower head than attainable before. The mechanical vibration or agitation helps prevent bubbling or gas pocket formation, geysering, and channeling or ratholing that would tend to cause an ideal fluidized bed to lose its theoretically uniform density and thus to be less efficient in properly coating the coarse materials. The addition of mechanical vibration makes possible the use of fluid bed techniques where all fractions of the coarse materials to be coated and the other materials in the system may not be fluidizable. Further, the addition of vibration greatly reduces the necessity for maintaining permeability of the pervious deck through which fluidizing gases are induced in the embodiment shown. Therefore, any suitable method or construction for injecting the fluidizing gas beneath the material to be fluidized may be utilized. This results in allowing the use commercially of heavier sections and more suitable construction materials which improve the high temperature and the high shock load service.

The hereinbefore described and disclosed fluidized coating machine and method of coating has been utilized with great success in coating pelletized fertilizer with fuller's earth. The method and apparatus has also been utilized to fluidize a talc and convey rubber pellets therethrough to be coated with the talc, as well as a number of other items that commonly are coated with fluidizable material for various reasons. The two examples given above are coated to prevent agglomeration when stored. The pelletized fertilizer, of course, is the final product and it is desired to prevent agglomeration before being disposed of to and used by the consumer. The rubber pellets are generally an intermediate product for use in making various rubber objects at later stages, but which are coated for storage until such use is desired, again to prevent agglomeration.

Various modifications in the arrangements of the conveyors may be made without departing from the spirit and scope of the invention.

Having described the invention, I claim:

1. In an apparatus for coating relatively coarse particles with a fine powdery material, in combination, a helical vibratory conveyor, means for maintaining a bed of fine material about the lower end of the helical conveyor, means for fluidizing the bed of fine material, and means for introducing the coarse particles into said bed of fine material for movement to and up the helical conveyor.

2. In an apparatus for coating relatively coarse particles with a fine powdery material, in combination, a base adapted to vibrate along a helical path, a container for said fine material mounted on said base, a porous deck in said container, a helical conveyor mounted on said base and extending upwardly from said porous deck, means for introducing the coarse particles into the container above the deck, said deck being sloped to direct the particles toward the helical conveyor, and means for forcing air upwardly through said deck to fluidize the fine material.

3. In an apparatus for coating relatively coarse particles with a fine powdery material, in combination, a base adapted to vibrate along a helical path, a container mounted on said base, a porous deck mounted in the container and serving as a support for the fine material and coarse particles in the container, means for driving air upwardly through said porous deck at a rate to fluidize the fine material, a helical conveyor trough erected on said base and extending upwardly from the porous deck for elevating coated particles from the fine material, said deck being sloped toward the conveyor trough, means on the conveyor trough for separating the particles from the excess fine material on the trough, and means for returning the fine material to the container.

4. An apparatus according to claim 3 in which the helical conveyor trough encircles a central vertical tube and the tube serves as a return conduit for the fine material.

5. In an apparatus for coating relatively coarse particles with a fine powdery material, in combination, a material conveying trough, a plurality of spaced apart porous sections in the bed of the conveying trough, means of forcing air upwardly through said porous sections to fluidize any fine material thereon, means for vibrating the trough to convey said particles along the trough through said fluidized fines, means downstream from said spaced apart porous sections for separating the coarse particles from the fine materials, and means for returning the separated fine material to the upstream end of the conveyor trough.

6. In an apparatus for coating relatively coarse particles with a fine powdery material, in combination, a vibratory conveyor trough having a deck that includes at least one porous section, said trough being adapted to contain a bed of fine powdery material, means for passing a gaseous fluid upwardly through said porous section at a rate to fluidize powdery material thereabove, means for introducing coarse particles into said conveyor trough, means for vibrating the trough along a path to convey the coarse particles along the conveyor trough and across said porous section, and means for separating the conveyed coarse particles from loose powdery material and returning such loose powdery material to the conveyor trough.

7. A method of coating tacky relatively coarse particles of material with a fine powdery material capable of adhering to the tacky particles comprising the steps of fluidizing a bed of the fine powdery material in a container having an ascending ramp, introducing the tacky coarse particles into the bed of fine powdery material in the container, and vibrating the container along a path at an amplitude and frequency to intermix the coarse and fine materials to coat the coarse particles with the fine material and to convey the coarse particles through the bed and up the ascending ramp.

8. A method of coating tacky relatively coarse particles of material with a fine powdery material capable of adhering to the tacky particles comprising the steps of fluidizing a bed of the fine powdery material in a container having an ascending ramp, introducing the tacky coarse particles into the bed of fine powdery material in the container, vibrating the container along a path at an amplitude and frequency to intermix the coarse and fine materials to coat the coarse material and to convey the coarse particles through the bed and up the ascending ramp, and separating the coated coarse particles from loose fine material arriving at the upper end of the ascending ramp.

9. A method of coating tacky relatively coarse particles of material with a fine powdery material capable of adhering to the tacky particles that comprises the steps of fluidizing alternate sections of a bed of the fine powdery material in a container having an ascending ramp, introducing coarse tacky particles to be coated into the bed of fine powdery material, vibrating the container to intermix the coarse and fine materials to coat the coarse material and to convey said coarse particles through said alternate sections of the bed and up the ascending ramp, and separating the coated coarse particles from the loose fine powdery material.

References Cited in the file of this patent

UNITED STATES PATENTS

| | | |
|---|---|---|
| 1,534,846 | Fraser et al. | Apr. 21, 1925 |
| 1,801,195 | Fraser | Apr. 14, 1931 |
| 2,059,983 | Dent et al. | Nov. 3, 1936 |
| 2,094,786 | Flint | Oct. 5, 1937 |
| 2,290,806 | Hodgin | July 21, 1942 |
| 2,310,894 | Brusset | Feb. 9, 1943 |
| 2,346,500 | Moore | Apr. 11, 1944 |
| 2,374,331 | Cooke | Apr. 24, 1945 |
| 2,399,717 | Arveson | May 7, 1946 |
| 2,498,218 | Nielsen | Feb. 21, 1950 |
| 2,561,393 | Marshall | July 24, 1951 |
| 2,648,609 | Wurster | Aug. 11, 1953 |
| 2,723,054 | Louden et al. | Nov. 8, 1955 |
| 2,729,597 | Garbo | Jan. 3, 1956 |
| 2,743,196 | Robinson | Apr. 24, 1956 |
| 2,795,318 | Morris | June 11, 1957 |
| 2,844,489 | Gemmer | July 22, 1958 |